US009452708B2

United States Patent
Salter et al.

(10) Patent No.: US 9,452,708 B2
(45) Date of Patent: Sep. 27, 2016

(54) VEHICLE BADGE

(71) Applicant: Ford Global Technologies, LLC, Dearborn, MI (US)

(72) Inventors: Stuart C. Salter, White Lake, MI (US); Pietro Buttolo, Dearborn Heights, MI (US); James J. Surman, Dearborn, MI (US); Paul Kenneth Dellock, Northville, MI (US); Michael A. Musleh, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/040,279

(22) Filed: Feb. 10, 2016

(65) Prior Publication Data

US 2016/0185284 A1 Jun. 30, 2016

Related U.S. Application Data

(63) Continuation-in-part of application No. 14/322,464, filed on Jul. 2, 2014, which is a continuation-in-part of application No. 14/301,635, filed on Jun. 11, 2014, which is a continuation-in-part of application No. 14/156,869, filed on Jan. 16, 2014, which is a continuation-in-part of application No. 14/086,442, filed on Nov. 21, 2013.

(51) Int. Cl.
*B60Q 1/50* (2006.01)
*B60R 13/00* (2006.01)
*G09F 21/04* (2006.01)

(52) U.S. Cl.
CPC .............. *B60Q 1/50* (2013.01); *B60R 13/005* (2013.01); *G09F 21/04* (2013.01)

(58) Field of Classification Search
CPC ........ B60Q 1/50; B60R 13/005; G09F 21/04
See application file for complete search history.

(56) References Cited

U.S. PATENT DOCUMENTS

| | | | |
|---|---|---|---|
| 5,709,453 | A | 1/1998 | Krent et al. |
| 5,856,030 | A | 1/1999 | Burrows |
| 6,177,029 | B1 | 1/2001 | Kaz et al. |
| 6,729,738 | B2 | 5/2004 | Fuwausa et al. |
| 6,773,129 | B2 | 8/2004 | Anderson, Jr. et al. |
| 6,851,840 | B2 | 2/2005 | Ramamurthy et al. |
| 6,871,986 | B2 | 3/2005 | Yamanaka et al. |
| 6,990,922 | B2 | 1/2006 | Ichikawa et al. |

(Continued)

FOREIGN PATENT DOCUMENTS

| | | |
|---|---|---|
| CN | 101337492 A | 1/2009 |
| CN | 201169230 Y | 2/2009 |

(Continued)

*Primary Examiner* — David V Bruce
(74) *Attorney, Agent, or Firm* — Jason Rogers; Price Heneveld LLP

(57) ABSTRACT

A badge is provided herein. The badge includes a housing attached to a substrate to form a viewable portion, a peripheral portion, and a rear portion. A light source is operably coupled with an optical device. A first photoluminescent structure is disposed between the light source and housing and is configured to emit a first converted light in response to a first excitation light. A second photoluminescent structure is disposed between the first photoluminescent structure and the housing and is configured to emit a second converted light in response to a second excitation light.

20 Claims, 9 Drawing Sheets

(56) References Cited

U.S. PATENT DOCUMENTS

| | | |
|---|---|---|
| 7,213,923 B2 | 5/2007 | Liu et al. |
| 7,241,021 B2 | 7/2007 | Hannington |
| 7,264,366 B2 | 9/2007 | Hulse |
| 7,264,367 B2 | 9/2007 | Hulse |
| 7,441,914 B2 | 10/2008 | Palmer et al. |
| 7,745,818 B2 | 6/2010 | Sofue et al. |
| 7,753,541 B2 | 7/2010 | Chen et al. |
| 7,834,548 B2 | 11/2010 | Jousse et al. |
| 7,862,220 B2 | 1/2011 | Cannon et al. |
| 7,987,030 B2 | 7/2011 | Flores et al. |
| 8,016,465 B2 | 9/2011 | Egerer et al. |
| 8,071,988 B2 | 12/2011 | Lee et al. |
| 8,203,260 B2 | 6/2012 | Li et al. |
| 8,286,378 B2 | 10/2012 | Martin et al. |
| 8,408,766 B2 | 4/2013 | Wilson et al. |
| 8,421,811 B2 | 4/2013 | Odland et al. |
| 8,466,438 B2 | 6/2013 | Lambert et al. |
| 8,519,362 B2 | 8/2013 | Labrot et al. |
| 8,606,430 B2 | 12/2013 | Seder et al. |
| 8,624,716 B2 | 1/2014 | Englander |
| 8,631,598 B2 | 1/2014 | Li et al. |
| 8,683,722 B1 | 4/2014 | Cowan |
| 8,724,054 B2 | 5/2014 | Jones |
| 8,752,989 B2 | 6/2014 | Roberts et al. |
| 8,773,012 B2 | 7/2014 | Ryu et al. |
| 9,057,021 B2 | 6/2015 | Kingsley et al. |
| 2002/0159741 A1 | 10/2002 | Graves et al. |
| 2002/0163792 A1 | 11/2002 | Formoso |
| 2003/0179548 A1 | 9/2003 | Becker et al. |
| 2004/0213088 A1 | 10/2004 | Fuwausa |
| 2006/0028815 A1 | 2/2006 | Robin |
| 2006/0087826 A1 | 4/2006 | Anderson, Jr. |
| 2006/0225326 A1 | 10/2006 | Robinson et al. |
| 2007/0032319 A1 | 2/2007 | Tufte |
| 2007/0285938 A1 | 12/2007 | Palmer et al. |
| 2009/0219730 A1 | 9/2009 | Syfert et al. |
| 2009/0251920 A1 | 10/2009 | Kino et al. |
| 2011/0095232 A1 | 4/2011 | Mahany |
| 2012/0001406 A1 | 1/2012 | Paxton et al. |
| 2012/0280528 A1 | 11/2012 | Dellock et al. |
| 2013/0335994 A1 | 12/2013 | Mulder et al. |
| 2014/0266666 A1 | 9/2014 | Habibi |
| 2014/0373898 A1 | 12/2014 | Rogers et al. |
| 2015/0046027 A1 | 2/2015 | Sura et al. |
| 2015/0154896 A1* | 6/2015 | Dellock .................. G09F 21/04 362/509 |
| 2015/0175057 A1 | 6/2015 | Salter et al. |
| 2016/0016506 A1 | 1/2016 | Collins et al. |

FOREIGN PATENT DOCUMENTS

| | | |
|---|---|---|
| CN | 201193011 Y | 2/2009 |
| DE | 29708699 U1 | 7/1997 |
| DE | 10319396 A1 | 11/2004 |
| EP | 1793261 A1 | 6/2007 |
| EP | 2778209 A1 | 9/2014 |
| JP | 2000159011 A | 6/2000 |
| JP | 2007238063 A | 9/2007 |
| WO | 2006047306 A1 | 5/2006 |
| WO | 2014068440 A1 | 5/2014 |

* cited by examiner

VEHICLE BADGE

CROSS-REFERENCE TO RELATED APPLICATIONS

This application is a continuation-in-part of U.S. patent application Ser. No. 14/322,464, filed Jul. 2, 2014, and entitled "PHOTOLUMINESCENT VEHICLE BADGE," which is a continuation-in-part of U.S. patent application Ser. No. 14/301,635, filed Jun. 11, 2014, and entitled "PHOTOLUMINESCENT VEHICLE READING LAMP," which is a continuation-in-part of U.S. patent application Ser. No. 14/156,869, filed Jan. 16, 2014, and entitled "VEHICLE DOME LIGHTING SYSTEM WITH PHOTOLUMINESCENT STRUCTURE," which is a continuation-in-part of U.S. patent application Ser. No. 14/086,442, filed Nov. 21, 2013, and entitled "VEHICLE LIGHTING SYSTEM WITH PHOTOLUMINESCENT STRUCTURE." The aforementioned related applications are hereby incorporated by reference in their entirety.

FIELD OF THE INVENTION

The present disclosure generally relates to vehicle lighting systems, and more particularly, to vehicle lighting systems employing one or more photoluminescent structures.

BACKGROUND OF THE INVENTION

Illumination arising from the use of photoluminescent structures offers a unique and attractive viewing experience. It is therefore desired to implement such structures in automotive vehicles for various lighting applications.

SUMMARY OF THE INVENTION

According to one aspect of the present invention, a badge is disclosed. The badge includes a housing attached to a substrate to form a viewable portion, a peripheral portion, and a rear portion. A light source is operably coupled with an optical device. A first photoluminescent structure is disposed between the light source and housing and is configured to emit a first converted light in response to a first excitation light. A second photoluminescent structure is disposed between the first photoluminescent structure and the housing and is configured to emit a second converted light in response to a second excitation light.

According to another aspect of the present invention, a badge is disclosed. The badge includes a housing attached to a substrate to form a viewable portion, a peripheral portion, and a rear portion. A light source is disposed between the housing and substrate and is operably coupled with an optical device. A first photoluminescent structure and a second photoluminescent structure are each disposed between the light source and housing. The first photoluminescent structure and the second photoluminescent structures are each configured to emit a converted light through a light transmissive portion in response to an excitation light.

According to another aspect of the present invention, a badge is disclosed. The badge includes a housing attached to a substrate. A viewable portion on the housing having a light transmissive portion. A light source is disposed between the housing and the substrate and is operably coupled with an optical device. A first photoluminescent structure including a long persistence photoluminescent material is disposed between the light source and the housing and configured to emit a converted light in response to an excitation light.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present invention are disclosed herein. However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The following disclosure describes an illuminated badge that may be attached to a vehicle. The badge may include one or more photoluminescent structures configured to convert an excitation light received from an associated light source to a converted light at a different wavelength typically found in the visible spectrum.

Figure 1A:
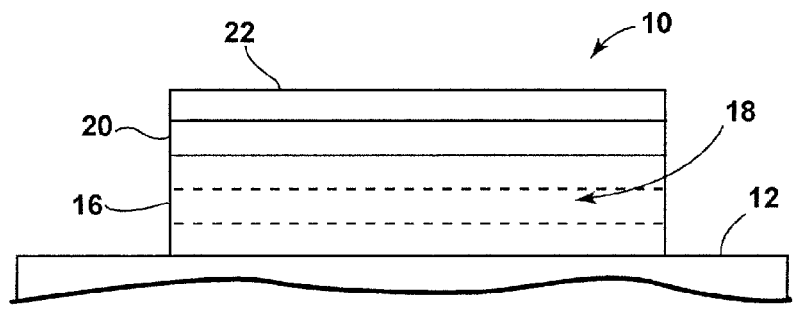
FIG. 1A is a side view of a photoluminescent structure rendered as a coating for use in a vehicle badge according to one embodiment.
Figure 1B:
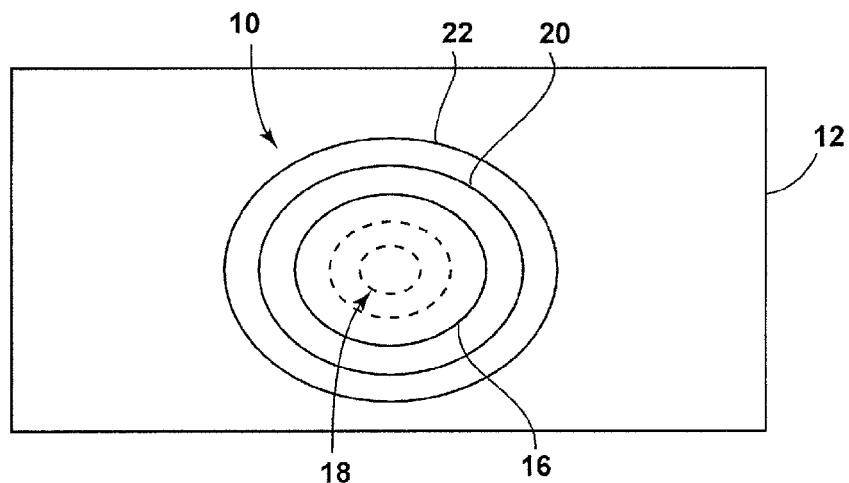
FIG. 1B is a top view of a photoluminescent structure rendered as a discrete particle according to one embodiment.
Figure 1C:
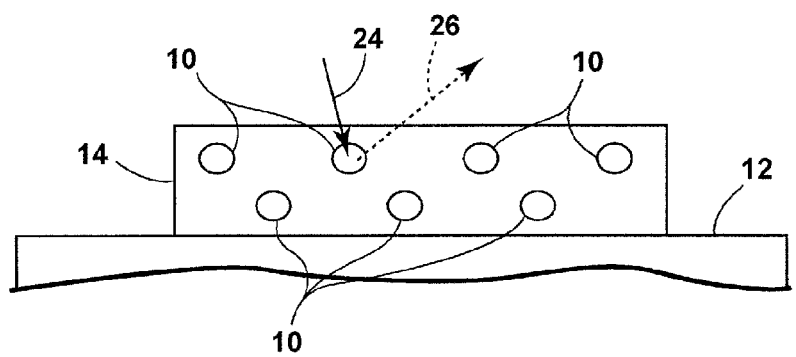
FIG. 1C is a side view of a plurality photoluminescent structures rendered as discrete particles and incorporated into a separate structure.

Referring to FIGS. 1A-1C, various exemplary embodiments of photoluminescent structures 10 are shown, each capable of being coupled to a substrate 12, which may correspond to a vehicle fixture or vehicle related piece of equipment. In FIG. 1A, the photoluminescent structure 10 is generally shown rendered as a coating (e.g., a film) that may be applied to a surface of the substrate 12. In FIG. 1B, the photoluminescent structure 10 is generally shown as a discrete particle capable of being integrated with a substrate 12. In FIG. 1C, the photoluminescent structure 10 is generally shown as a plurality of discrete particles that may be incorporated into a support medium 14 (e.g., a film) that may then be applied (as shown) or integrated with the substrate 12.

At the most basic level, a given photoluminescent structure 10 includes an energy conversion layer 16 that may include one or more sub layers, which are exemplarily shown through broken lines in FIGS. 1A and 1B. Each sub layer of the energy conversion layer 16 may include one or more photoluminescent materials 18 having energy converting elements with phosphorescent or fluorescent properties. Each photoluminescent material 18 may become excited upon receiving an excitation light 24 of a specific wavelength, thereby causing the light to undergo a conversion process. Under the principle of down conversion, the excitation light 24 is converted into a longer wavelength, converted light 26 that is outputted from the photoluminescent structure 10. Conversely, under the principle of up conversion, the excitation light 24 is converted into a shorter wavelength light that is outputted from the photoluminescent structure 10. When multiple distinct wavelengths of light are outputted from the photoluminescent structure 10 at the same time, the wavelengths of light may mix together and be expressed as a multicolor light.

Light emitted by a light source 42 (FIG. 4) is referred to herein as excitation light 24 and is illustrated herein as solid arrows. In contrast, light emitted from the photoluminescent structure 10 is referred to herein as converted light 26 and is illustrated herein as broken arrows. The mixture of excitation light 24 and converted light 26 that may be emitted simultaneously is referred to herein as outputted light.

The energy conversion layer 16 may be prepared by dispersing the photoluminescent material 18 in a polymer matrix to form a homogenous mixture using a variety of methods. Such methods may include preparing the energy conversion layer 16 from a formulation in a liquid carrier medium 14 and coating the energy conversion layer 16 to a desired substrate 12. The energy conversion layer 16 may be applied to a substrate 12 by painting, screen printing, spraying, slot coating, dip coating, roller coating, and bar coating. Alternatively, the energy conversion layer 16 may be prepared by methods that do not use a liquid carrier medium 14. For example, the energy conversion layer 16 may be rendered by dispersing the photoluminescent material 18 into a solid state solution (homogenous mixture in a dry state) that may be incorporated in a polymer matrix, which may be formed by extrusion, injection molding, compression molding, calendaring, thermoforming, etc. The energy conversion layer 16 may then be integrated into a substrate 12 using any methods known to those skilled in the art. When the energy conversion layer 16 includes sub layers, each sub layer may be sequentially coated to form the energy conversion layer 16. Alternatively, the sub layers can be separately prepared and later laminated or embossed together to form the energy conversion layer 16. Alternatively still, the energy conversion layer 16 may be formed by coextruding the sub layers.

In some embodiments, the converted light 26 that has been down converted or up converted may be used to excite other photoluminescent material(s) 18 found in the energy conversion layer 16. The process of using the converted light 26 outputted from one photoluminescent material 18 to excite another, and so on, is generally known as an energy cascade and may serve as an alternative for achieving various color expressions. With respect to either conversion principle, the difference in wavelength between the excitation light 24 and the converted light 26 is known as the Stokes shift and serves as the principle driving mechanism for an energy conversion process corresponding to a change in wavelength of light. In the various embodiments discussed herein, each of the photoluminescent structures 10 may operate under either conversion principle.

Referring back to FIGS. 1A and 1B, the photoluminescent structure 10 may optionally include at least one stability layer 20 to protect the photoluminescent material 18 contained within the energy conversion layer 16 from photolytic and thermal degradation. The stability layer 20 may be configured as a separate layer optically coupled and adhered to the energy conversion layer 16. Alternatively, the stability layer 20 may be integrated with the energy conversion layer 16. The photoluminescent structure 10 may also optionally include a protective layer 22 optically coupled and adhered to the stability layer 20 or other layer (e.g., the conversion layer 16 in the absence of the stability layer 20) to protect the photoluminescent structure 10 from physical and chemical damage arising from environmental exposure. The stability layer 20 and/or the protective layer 22 may be combined with the energy conversion layer 16 through sequential coating or printing of each layer, sequential lamination or embossing, or any other suitable means.

Additional information regarding the construction of photoluminescent structures 10 is disclosed in U.S. Pat. No. 8,232,533 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," the entire disclosure of which is incorporated herein by reference. For additional information regarding fabrication and utilization of photoluminescent materials to achieve various light emissions, refer to U.S. Pat. No. 8,207,511 to Bortz et al., entitled "PHOTOLUMINESCENT FIBERS, COMPOSITIONS AND FABRICS MADE THEREFROM"; U.S. Pat. No. 8,247,761 to Agrawal et al., entitled "PHOTOLUMINESCENT MARKINGS WITH FUNCTIONAL OVERLAYERS"; U.S. Pat. No. 8,519,359 B2 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION"; U.S. Pat. No. 8,664,624 B2 to Kingsley et al., entitled "ILLUMINATION DELIVERY SYSTEM FOR GENERATING SUSTAINED SECONDARY EMISSION"; U.S. Patent Publication No. 2012/0183677 to Agrawal et al., entitled "PHOTOLUMINESCENT COMPOSITIONS, METHODS OF MANUFACTURE AND NOVEL USES"; U.S. Pat. No. 9,057,021 to Kingsley et al., entitled "PHOTOLUMINESCENT OBJECTS"; and U.S. Patent Publication No. 2014/0103258

A1 to Agrawal et al., entitled "CHROMIC LUMINESCENT COMPOSITIONS AND TEXTILES," all of which are incorporated herein by reference in their entirety.

According to one embodiment, the photoluminescent material 18 may include organic or inorganic fluorescent dyes including rylenes, xanthenes, porphyrins, phthalocyanines. Additionally, or alternatively, the photoluminescent material 18 may include phosphors from the group of Ce-doped garnets such as YAG:Ce and may be a short persistence photoluminescent material 18. For example, an emission by $Ce^{3+}$ is based on an electronic energy transition from $5d^1$ to $4f^1$ as a parity allowed transition. As a result of this, a difference in energy between the light absorption and the light emission by $Ce^{3+}$ is small, and the luminescent level of $Ce^{3+}$ has a ultra-short lifespan, or decay time, of $10^{-8}$ to $10^{-7}$ seconds (10 to 100 nanoseconds). The decay time may be defined as the time between the end of excitation from the excitation light 24 and the moment when the light intensity of the converted light 26 emitted from the photoluminescent structure 10 drops below a minimum visibility of 0.32 mcd/m². A visibility of 0.32 mcd/m² is roughly 100 times the sensitivity of the dark-adapted human eye, which corresponds to a base level of illumination commonly used by persons of ordinary skill in the art.

According to one embodiment, a $Ce^{3+}$ garnet may be utilized, which has a peak excitation spectrum that may reside in a shorter wavelength range than that of conventional YAG:Ce-type phosphors. Accordingly, $Ce^{3+}$ has short persistence characteristics such that its decay time may be 100 milliseconds or less. Therefore, in some embodiments, the rare earth aluminum garnet type Ce phosphor may serve as the photoluminescent material 18 with ultra-short persistence characteristics, which can emit the converted light 26 by absorbing purple to blue excitation light 24 emitted from a light source 42. According to one embodiment, a ZnS:Ag phosphor may be used to create a blue converted light 26. A ZnS:Cu phosphor may be utilized to create a yellowish-green converted light 26. A $Y_2O_2S$:Eu phosphor may be used to create red converted light 26. Moreover, the aforementioned phosphorescent materials may be combined to form a wide range of colors, including white light. It will be understood that any short persistence photoluminescent material known in the art may be utilized without departing from the teachings provided herein. Additional information regarding the production of short persistence photoluminescent materials is disclosed in U.S. Pat. No. 8,163,201 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," the entire disclosure of which is incorporated herein by reference.

Additionally, or alternatively, the photoluminescent material 18, according to one embodiment, disposed within the photoluminescent structure 10 may include a long persistence photoluminescent material 18 that emits the converted light 26, once charged by the excitation light 24. The excitation light 24 may be emitted from any excitation source (e.g., any natural and/or artificial light source). The long persistence photoluminescent material 18 may be defined as having a long decay time due to its ability to store the excitation light 24 and release the converted light 26 gradually, for a period of several minutes or hours, once the excitation light 24 is no longer present.

The long persistence photoluminescent material 18, according to one embodiment, may be operable to emit light at or above an intensity of 0.32 mcd/m² after a period of 10 minutes. Additionally, the long persistence photoluminescent material 18 may be operable to emit light above or at an intensity of 0.32 mcd/m² after a period of 30 minutes and, in some embodiments, for a period substantially longer than 60 minutes (e.g., the period may extend 24 hours or longer, and in some instances, the period may extend 48 hours). Accordingly, the long persistence photoluminescent material 18 may continually illuminate in response to excitation from a plurality of light sources 42 that emit the excitation light 24, including, but not limited to, natural light sources (e.g., the sun) and/or any artificial light source 42. The periodic absorption of the excitation light 24 from any excitation source may provide for a substantially sustained charge of the long persistence photoluminescent material 18 to provide for consistent passive illumination. In some embodiments, a light sensor may monitor the illumination intensity of the photoluminescent structure 10 and actuate an excitation source when the illumination intensity falls below 0.32 mcd/m², or any other predefined intensity level.

The long persistence photoluminescent material 18 may correspond to alkaline earth aluminates and silicates, for example doped di-silicates, or any other compound that is capable of emitting light for a period of time once the excitation light 24 is no longer present. The long persistence photoluminescent material 18 may be doped with one or more ions, which may correspond to rare earth elements, for example, $Eu^{2-}$, $Tb^{3+}$ and/or $Dy^3$. According to one non-limiting exemplary embodiment, the photoluminescent structure 10 includes a phosphorescent material in the range of about 30% to about 55%, a liquid carrier medium in the range of about 25% to about 55%, a polymeric resin in the range of about 15% to about 35%, a stabilizing additive in the range of about 0.25% to about 20%, and performance-enhancing additives in the range of about 0% to about 5%, each based on the weight of the formulation.

The photoluminescent structure 10, according to one embodiment, may be a translucent white color, and in some instances reflective, when unilluminated. Once the photoluminescent structure 10 receives the excitation light 24 of a particular wavelength, the photoluminescent structure 10 may emit any color light (e.g., blue or red) therefrom at any desired brightness. According to one embodiment, a blue emitting phosphorescent material may have the structure $Li_2ZnGeO_4$ and may be prepared by a high temperature solid-state reaction method or through any other practicable method and/or process. The afterglow may last for a duration of two to eight hours and may originate from the excitation light 24 and d-d transitions of $Mn^{2+}$ ions.

According to an alternate non-limiting exemplary embodiment, 100 parts of a commercial solvent-borne polyurethane, such as Mace resin 107-268, having 50% solids polyurethane in Toluene/Isopropanol, 125 parts of a blue green long long persistence phosphor, such as Performance Indicator PI-BG20, and 12.5 parts of a dye solution containing 0.1% Lumogen Yellow F083 in dioxolane may be blended to yield a low rare earth mineral photoluminescent structure 10. It will be understood that the compositions provided herein are non-limiting examples. Thus, any phosphor known in the art may be utilized within the photoluminescent structure 10 without departing from the teachings provided herein. Moreover, it is contemplated that any long persistence phosphor known in the art may also be utilized without departing from the teachings provided herein.

Additional information regarding the production of long persistence photoluminescent materials is disclosed in U.S. Pat. No. 8,163,201 to Agrawal et al., entitled "HIGH-INTENSITY, PERSISTENT PHOTOLUMINESCENT FORMULATIONS AND OBJECTS, AND METHODS FOR CREATING THE SAME," the entire disclosure of which is incorporated herein by reference. For additional information regarding long persistence phosphorescent structures, refer to U.S. Pat. No. 6,953,536 to Yen et al., entitled "LONG PERSISTENT PHOSPHORS AND PERSISTENT ENERGY TRANSFER TECHNIQUE"; U.S. Pat. No. 6,117,362 to Yen et al., entitled "LONG-PERSISTENT BLUE PHOSPHORS"; and U.S. Pat. No. 8,952,341 to Kingsley et al., entitled "LOW RARE EARTH MINERAL PHOTOLUMINESCENT COMPOSITIONS AND STRUCTURES FOR GENERATING LONG-PERSISTENT LUMINESCENCE," all of which are incorporated herein by reference in their entirety.

Figure 2:
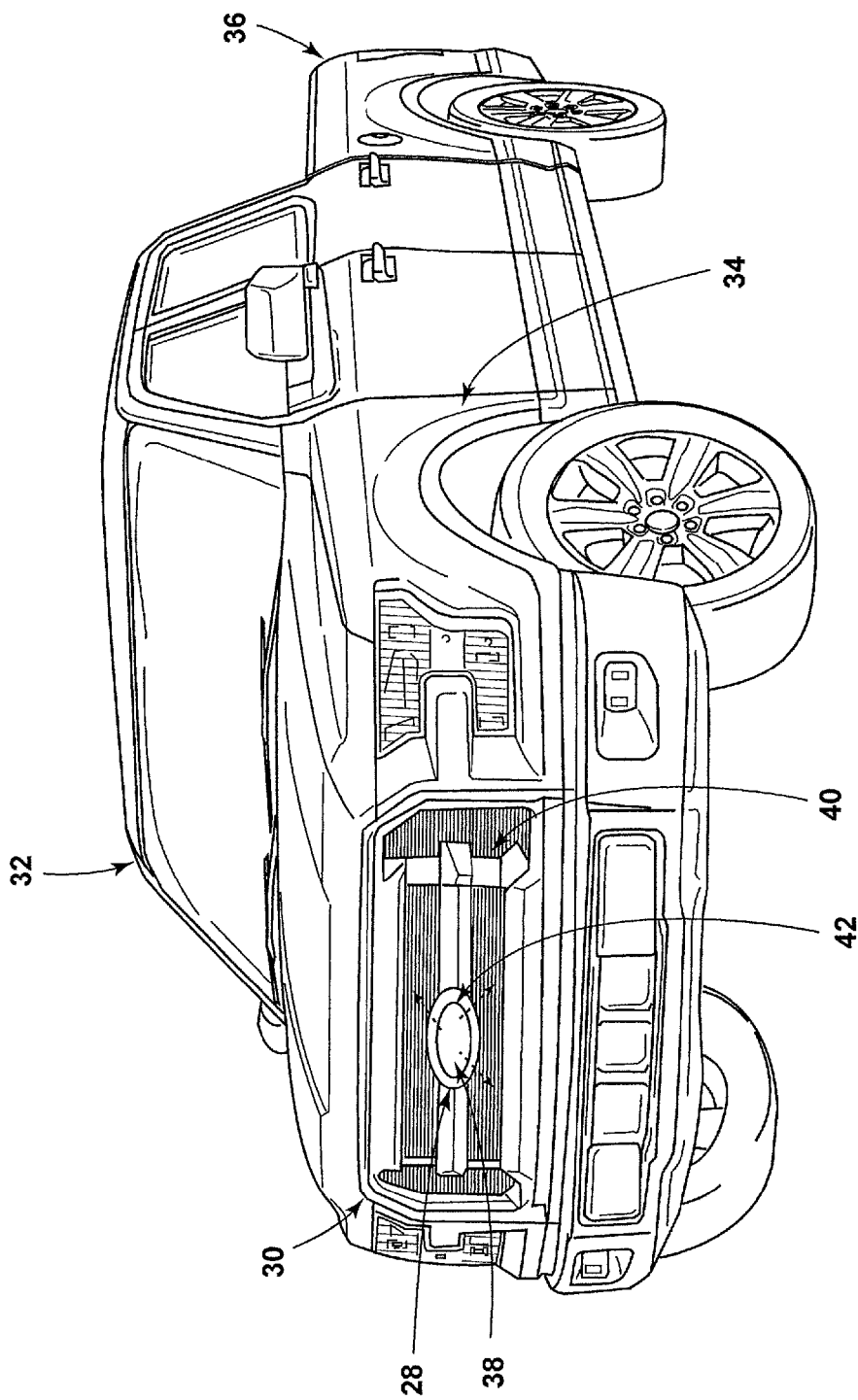
FIG. 2 is a front perspective view of a vehicle equipped with an illuminated badge on a grille assembly of a vehicle, according to one embodiment.

Referring now to FIG. 2, an illuminated badge 28 is generally shown mounted on a front portion 30 of a vehicle 32. In other embodiments, the badge 28 may be located elsewhere, such as, but not limited to, other locations of the front portion 30, a side portion 34, or a rear portion 36 of the vehicle 32. Alternatively, the badge 28 may be disposed inside the vehicle 32. The badge 28 may be configured as an insignia that is presented as an identifying mark of a vehicle manufacturer and includes a viewable portion 38 that is generally prominently displayed on the vehicle 32. In the presently illustrated embodiment, the badge 28 is centrally located on a grille assembly 40 of the vehicle 32, thus allowing the badge 28 to be readily viewed by an observer looking head-on at the vehicle 32. As will be described below in greater detail, one or more light sources 42 may be disposed within the badge 28 and may illuminate in a plurality of manners to provide a distinct styling element to the vehicle 32.

Figure 3:
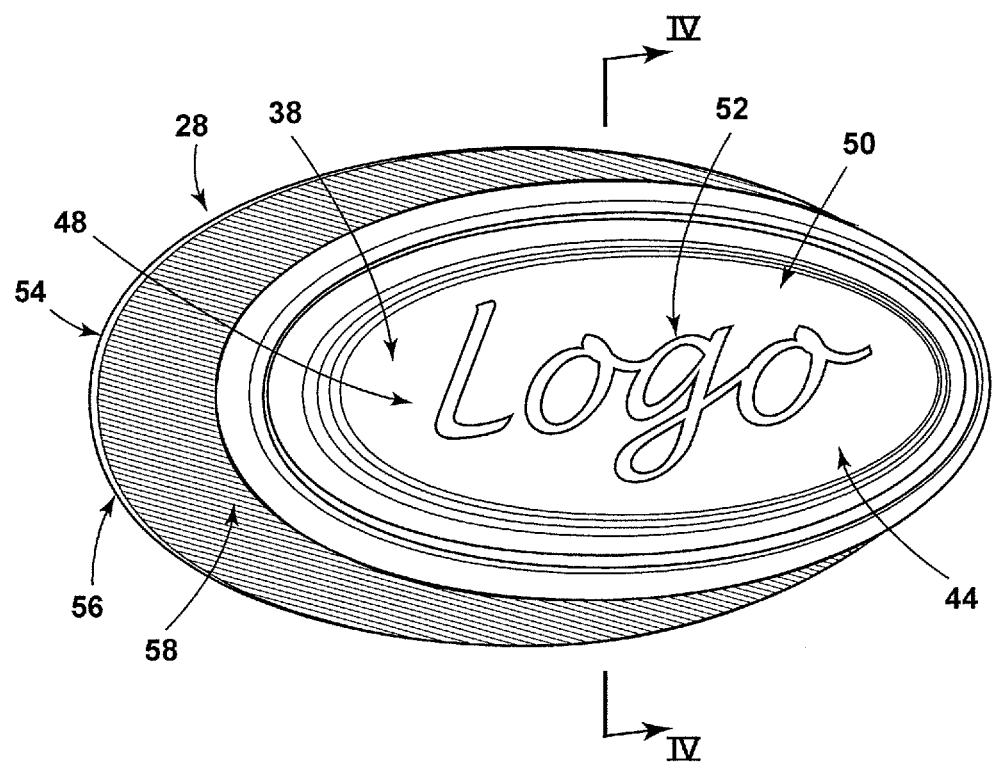
FIG. 3 is a front perspective view of the badge, according to one embodiment.

Referring to FIG. 3, the badge 28 is shown, according to one embodiment, having a housing 44 that includes the viewable portion 38 centrally located on a forward portion 48 thereof. The viewable portion 38 may include a background region 50 and indicia 52. The indicia 52 may signify the make, model, or any other information that may be desirable to confer about the vehicle 32 upon which the badge 28 is attached to. Some portions of the badge 28 may include light transmissive portions that are made of a transparent and/or translucent material while other portions may be opaque, as will be described in greater detail below.

The badge 28 may also include a substrate 54 that may be attached to the housing 44. The substrate 54 may form a rear portion 56 of the badge 28 and may be capable of being secured to the vehicle 32.

As illustrated in FIG. 3, the substrate 54 includes a peripheral portion 58 that extends forwardly therefrom. It will be understood, however, that the peripheral portion 58, or any other portion described herein, may be integrally formed with any other components, or later attached thereto without departing from the teachings provided herein. For example, the peripheral portion 58 may be an independent component or integrally formed with the housing 44 in alternate embodiments.

According to one embodiment, the housing 44 and/or the substrate 54 may be constructed from a rigid material such as, but not limited to, a polymeric material and may be assembled to one another via sonic welding, laser welding, vibration welding, injection molding, or any other process known in the art. Alternatively, the housing 44 and the substrate 54 may be assembled together via the utilization of adhesives and/or fasteners. Alternatively still, the housing 44 and substrate 54 may be integrally formed as a single component.

Figure 4:
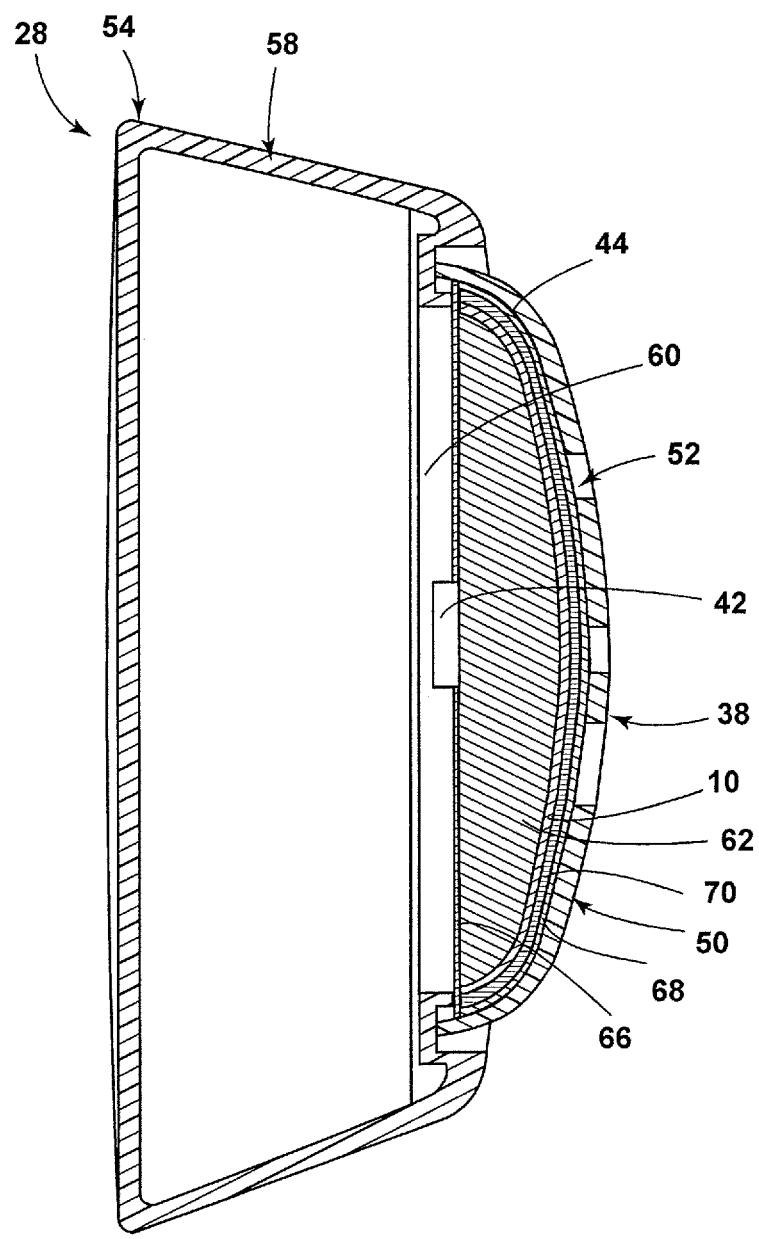
FIG. 4 is a cross-sectional view taken along the line IV-IV of FIG. 3 illustrating the badge having a central light source operably coupled with an optical device for transmitting light towards first and second photoluminescent structures disposed within a housing of the badge, according to one embodiment.

Referring to FIG. 4, a cross section of the badge 28 taken along the line IV-IV of FIG. 3 is illustrated. As illustrated, a printed circuit board (PCB) 60 may be secured between the substrate 54 and housing 44 and have the light source 42 disposed thereon. However, in alternate embodiments the light source 42 may be disposed on any other component without departing from the teachings provided herein. The light source 42 may include any form of light source. For example, fluorescent lighting, light emitting diodes (LEDs), organic LEDs (OLEDs), polymer LEDs (PLEDs), solid state lighting, or any other form of lighting configured to emit light may be utilized. According to one embodiment, the light source 42 may be configured to emit a wavelength of excitation light 24 that is characterized as ultraviolet light (~10-400 nanometers in wavelength), violet light (~380-450 nanometers in wavelength), or blue light (~450-495 nanometers in wavelength) to take advantage of the relative low cost attributable to those types of LEDs. A white solder mask 66 may be applied to the PCB 60 to reflect light incident thereon.

The light source 42 may be operably coupled with the optical device 62, which is a substantially transparent or translucent device suitable for transmitting light. The optical device 62 may be formed from a rigid material that includes a curable substrate such as a polymerizable compound, a mold in clear (MIC) material, or mixtures thereof. Acrylates are also commonly used for forming rigid light pipes, as well as poly methyl methacrylate (PMMA), which is a known substitute for glass. A polycarbonate material may also be used in an injection molding process to form the rigid optical device 62.

Further, the optical device 62 may be a flexible optical device, wherein a suitable flexible material is used to create the optical device 62. Such flexible materials include urethanes, silicone, thermoplastic polyurethane (TPU), or other like optical grade flexible materials. Whether the optical device 62 is flexible or rigid, the optical device 62, when formed, is substantially optically transparent and/or translucent and capable of transmitting light. The optical device 62 may be referred to as a light pipe, a light plate, a light bar or any other light carrying or transmitting substrate made from a clear or substantially translucent plastic. Known methods of attaching the optical device 62 to the badge 28 include the bonding of a preformed optical device to the badge 28 by adhesion, such as by using a double-sided tape, or by mechanical connections such as brackets that is formed into the badge 28.

In operation, the photoluminescent material 18 is formulated to become excited upon receiving excitation light 24 of a specific wavelength from an excitation source, such as natural light (e.g., the sun) and/or any artificial light source, such as light source 42. According to one embodiment, the excitation light 24 is converted by the photoluminescent structure 10 into light of a longer wavelength and outputted therefrom. The converted light 26 corresponds to a visible light, which includes the portion of the electromagnetic spectrum that can be detected by the human eye (~390-700 nanometers in wavelength) and may be expressed in a variety of colors defined by a single wavelength (e.g., red, green, blue) or a mixture of multiple wavelengths (e.g., white). Thus, it should be understood that the photoluminescent structure 10 may be configured such that the converted light 26 outputted therefrom is capable of being expressed as unicolored or multicolored light. According to one embodiment, the light sources 42 are configured to emit blue light and the photoluminescent structure 10 is configured to convert the blue light into a neutral white light having a color temperature of approximately 4000K to 5000K. The converted light 26 escapes from the badge 28 via the viewable portion 38. According to one embodiment, the photoluminescent structure 10 is substantially Lambertian, that is, the apparent brightness of the photoluminescent structure 10 is substantially constant regardless of an observer's angle of view. As a consequence, the converted light 26 may be emitted outwardly from the viewable portion 38 in numerous directions in a substantially uniform manner.

According to one embodiment, a first photoluminescent structure 10 is disposed on the optical device 62. The first photoluminescent structure 10 may be a long persistence photoluminescent material 18 that appears white in an unilluminated state and emanates a blue converted light 26 upon receiving the excitation light 24. Thus, according to one embodiment, the indicia 52 may correspond with the light transmissive portions 64 and may appear white, or metallic with the addition of a decorative layer 68, as will be described in greater detail below, above the first photoluminescent structure 10 in the unilluminated state. The first photoluminescent structure 10 may emit blue light once the first photoluminescent structure 10 is charged through the light transmissive portions 64. According to an alternate non-limiting exemplary embodiment, Cereus 8015 provided by Performance Indicator may be utilized as the photoluminescent material 18 that may be configured to have a white color in the unilluminated state and emit blue light in the excited state.

A second photoluminescent structure 70 may contain a second photoluminescent material 18 and be disposed between the first photoluminescent structure 10 and the viewable portion 38. The second photoluminescent structure 70 may be configured to shift the color of the first converted light 26 emitted from the first photoluminescent structure 10 to modify or tune the first converted light 26 emitted from the first photoluminescent structure 10 into a second converted light 102 of a third wavelength. In alternate embodiments, the second photoluminescent structure 70 may emit the second converted light 102 in response to any other excitation source. It is contemplated that the first and/or second photoluminescent structures 10, 70 may be disposed within the optical device 62 to minimize the thickness of the badge 28.

According to one embodiment, the light source 42 may emit the excitation light 24 at a first and/or a second wavelength, thereby exciting the first and/or the second photoluminescent structures 10, 70. The converted light 26 emitted from the first and/or the second photoluminescent structures 10, 70 may blend thereby emitting an outputted light in a wide range of colors. For example, a substantially white light may be outputted from the badge 28. In an alternative embodiment, the first and second photoluminescent structures 10, 70 may blend in any color to remove any natural color hue of the badge 28 based on the material used to create the badge 28. For example, plastics such as polycarbonate may naturally have a yellowish hue. However, this hue may be masked through the use of the first and/or the second photoluminescent structures 10, 70 thereby making the badge 28 illuminate and appear in any desired color. Alternatively, any type of light source, multicolored or unicolored, may be utilized to make the badge 28 illuminate in any desired color without the utilization of the first and/or the second photoluminescent structures 10, 70.

The indicia 52 may correspond to one or more light transmissive portions 64 in the housing 44. Alternatively, or additionally, the background region may also have transmissive portions 64 that emit light therethrough.

Figure 5:
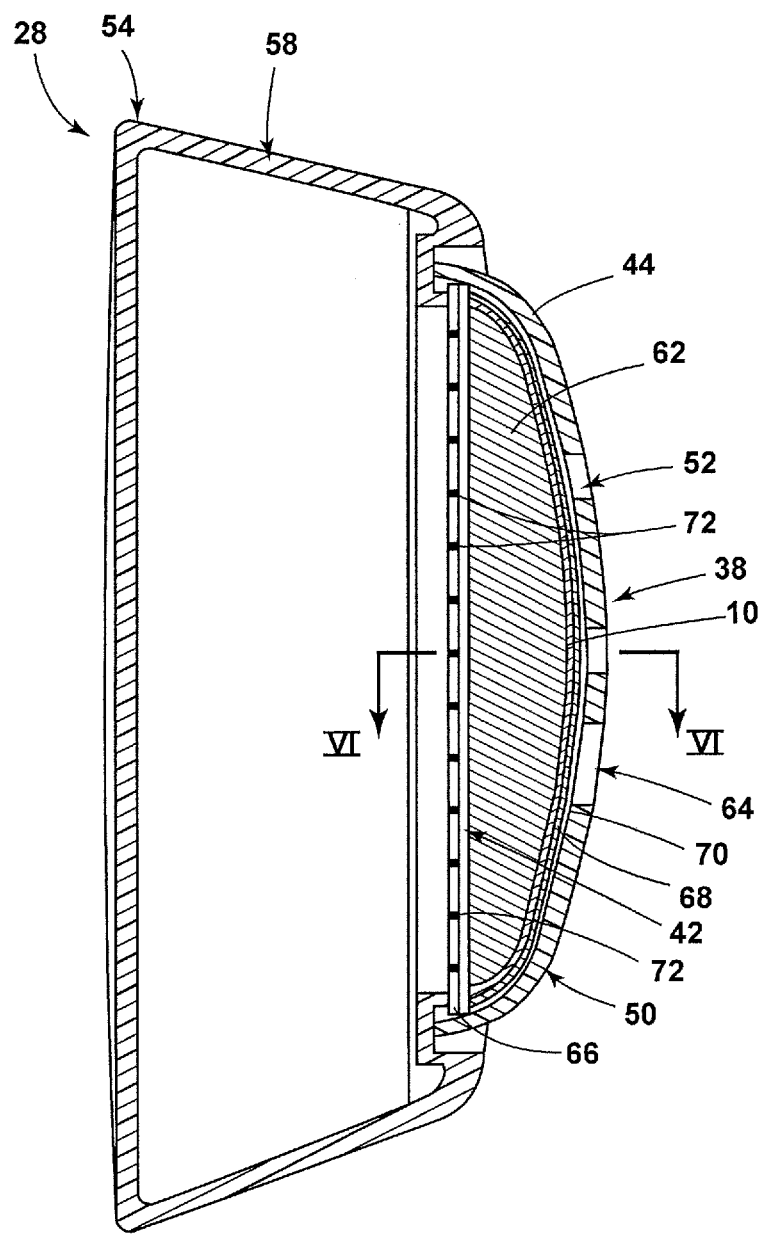
FIG. 5 is a cross-sectional view taken along the line IV-IV of FIG. 3 illustrating the badge having a plurality of LED sources operably coupled with the optical device for transmitting light towards first and second photoluminescent structures, according to another embodiment.

Referring to FIG. 5, a cross section of the badge 28 illustrated in FIG. 2 is illustrated along the line IV-IV, according to one embodiment. As illustrated in FIG. 5, the light source 42 may include a plurality of LED sources.

The badge 28 may include a decorative layer 68 that is forwardly of the first and/or second photoluminescent structure 10, 70 that is disposed on the base layer 46. The decorative layer 68 may include a polymeric material or any other suitable material and is configured to control or modify an appearance of the viewable portion 38. For example, the decorative layer 68 may be configured to confer a metallic appearance to the viewable portion 38. The metallic appearance can be disposed rearwardly of the housing 44, on the first photoluminescent structure 10, on the second photoluminescent structure 70, and/or on the optical device 62 through any method known in the art, including, but not limited to, sputter deposition, vacuum deposition (vacuum evaporation coating), electroplating, or directly printing onto the housing 44. The metallic appearance may be chosen from a wide range of reflective materials and/or colors, including, but not limited to, silver, chrome, copper, bronze, gold, or any other metallic surface. Additionally, an imitator of any metallic material may also be utilized without departing from the teachings provided herein.

Portions of the housing 44 and the substrate 54 that are readily visible (e.g., the peripheral portion 58 and viewable portion 38) may be colored any color or may be metalized. For example, a metallic layer may be applied to the peripheral portion 58 via partial vacuum deposition. According to an alternate embodiment, a metallic layer may be applied to any portion of the housing 44 or the substrate 54 via electroplating a thin layer of chromium thereon. Alternatively still, an imitator of chrome may be used for aesthetic purposes. The metallic layer or some portion thereof may be transparent and/or translucent to allow light to pass therethrough from an inner surface to an outer surface.

Similarly, the indicia 52 disposed on the viewable portion 38 may also confer a metallic appearance. According to one embodiment, the indicia 52 may have a translucent metallic layer disposed thereon. Accordingly, the indicia 52 may illuminate when the light source 42 is illuminated and confer a metallic appearance in the unilluminated state. The background region 50 may also be colored any desired color and/or incorporate a metallized finish on portions thereof. According to one embodiment, the background region 50 employs a translucent color (e.g., blue) thereby partially concealing the components of the badge 28 disposed rewardly of the viewable portion 38. Alternate processes may be used for coloring or layering material onto a portion of the housing 44 and/or the substrate 54, as known in the art without departing from the teachings provided herein.

In other embodiments, the decorative layer 68 may be tinted any color to complement the vehicle structure on which the badge 28 is to be received. In any event, the decorative layer 68 should be at least partially light transmissible such that the converted light 26 is not prevented from illuminating the viewable portion 38 whenever an energy conversion process is underway.

Figure 6:
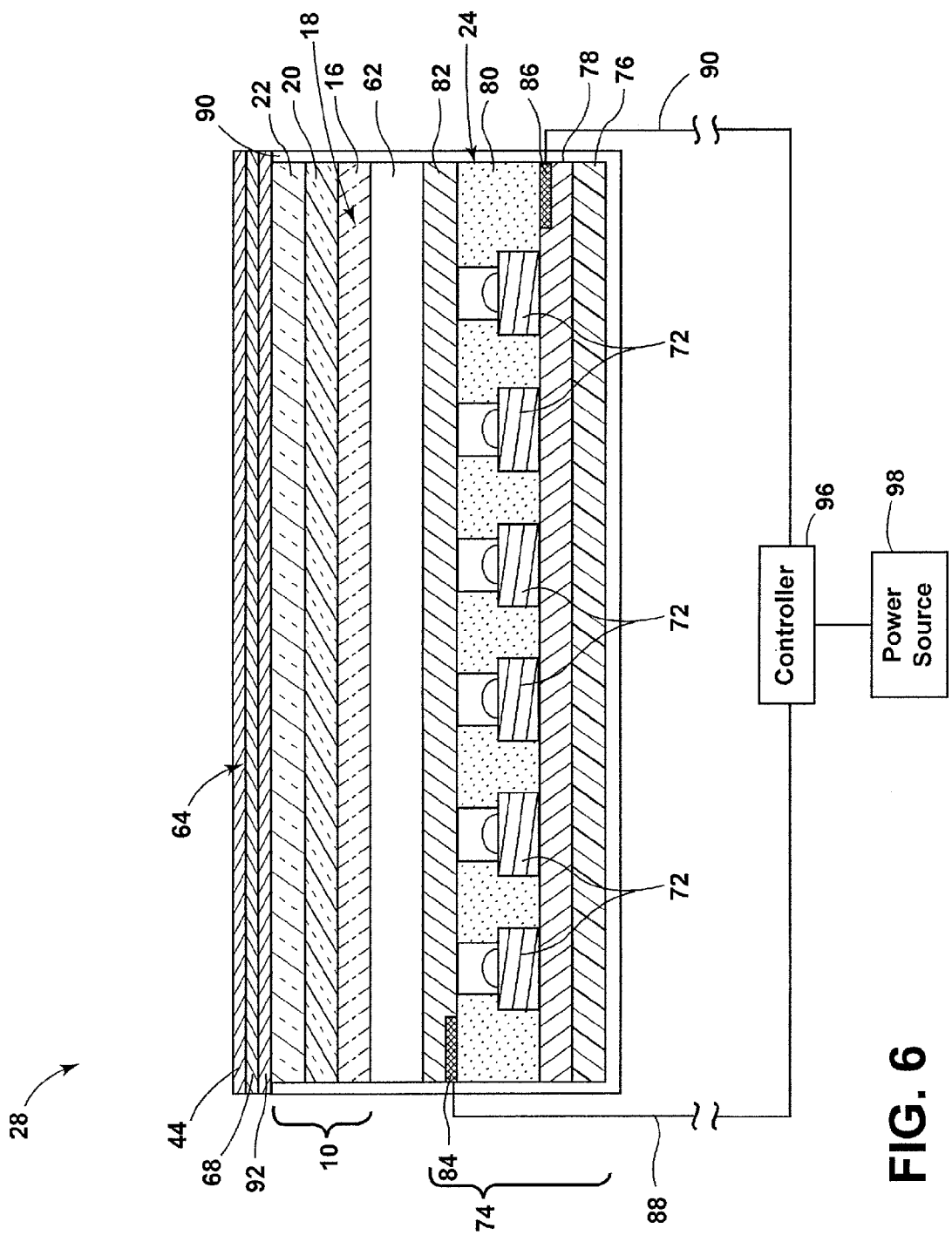
FIG. 6 is a cross-sectional view taken along line VI-VI of FIG. 5 illustrating the light source configured as a light-producing assembly, according to one embodiment.
Figure 7:
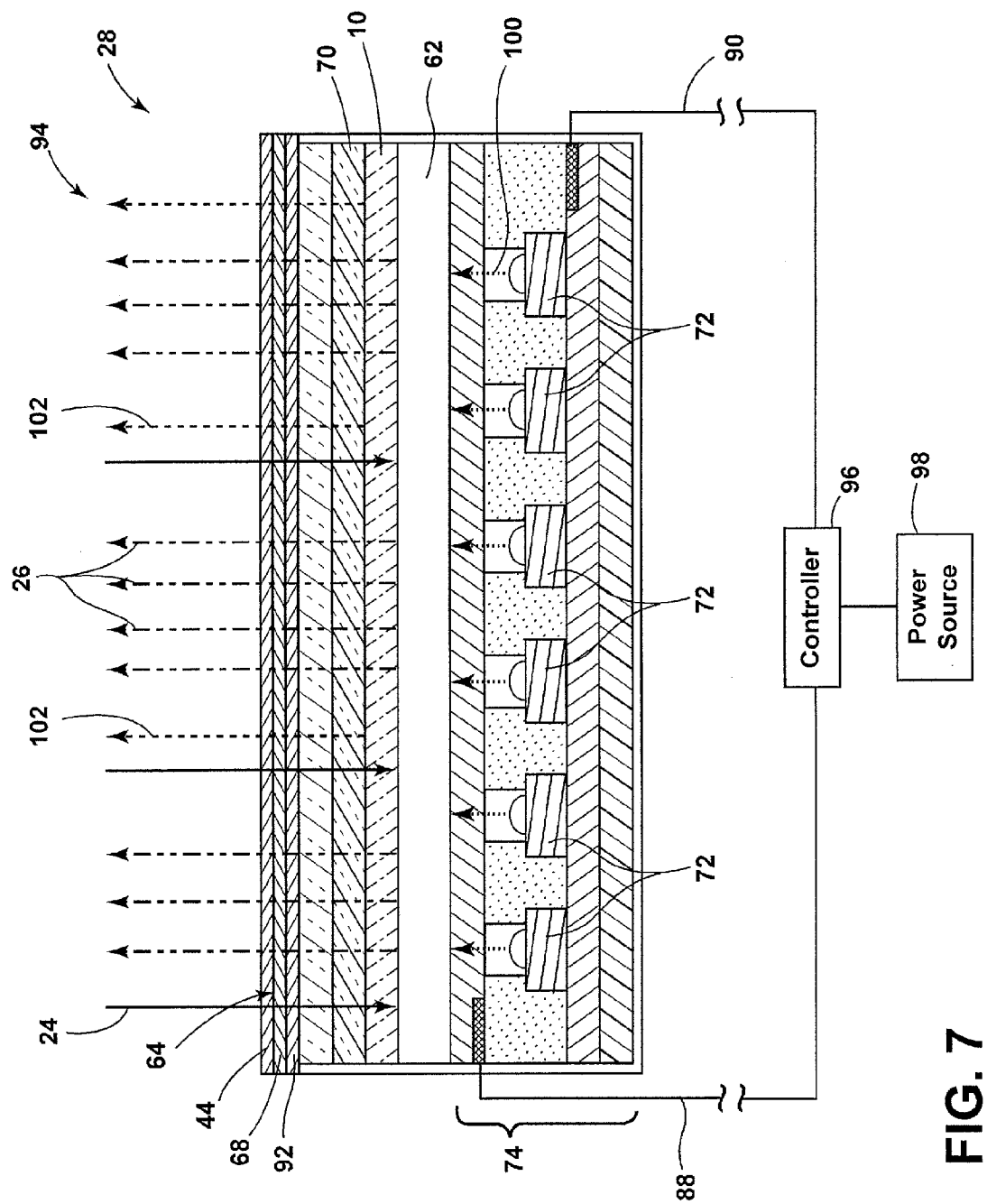
FIG. 7 is a cross-sectional view taken along line VI-VI of FIG. 5 illustrating the light source configured as a light-producing assembly, according to another embodiment.

Referring to FIGS. 6 and 7, a cross-sectional view of a forward portion 48 of the badge 28 including light source 42 configured as a light-producing assembly is shown, according to one embodiment, taken along the line VI-VI of FIG. 5. The light-producing assembly 74 may correspond to a thin-film or printed light emitting diode (LED) assembly and includes a base member 76 as its lowermost layer. The base member 76 may include a polycarbonate, poly-methyl methacrylate (PMMA), or polyethylene terephthalate (PET) material, or any other material known in the art, which may be in the range of 0.005 to 0.060 inches thick.

The light-producing assembly 74 includes a positive electrode 78 arranged over the base member 76. The positive electrode 78 includes a conductive epoxy such as, but not limited to, a silver-containing or copper-containing epoxy. The positive electrode 78 is electrically connected to at least a portion of a plurality of LED sources 72 arranged within a semiconductor ink 80 and applied over the positive electrode 78. Likewise, a negative electrode 82 is also electrically connected to at least a portion of the LED sources 72. The negative electrode 82 is arranged over the semiconductor ink 80 and includes a transparent or translucent conductive material such as, but not limited to, indium tin oxide.

Additionally, each of the positive and negative electrodes 78, 82 are electrically connected to a controller 96 and a power source 98 via a corresponding bus bar 84, 86 and conductive leads 88, 90. The bus bars 84, 86 may be printed along opposite edges of the positive and negative electrodes 78, 82 and the points of connection between the bus bars 84, 86 and the conductive leads 88, 90 may be at opposite corners of each bus bar 84, 86 to promote uniform current distribution along the bus bars 84, 86. It will be appreciated that in alternate embodiments, the orientation of components within the light-producing assembly 74 may be altered without departing from the concepts of the present disclosure. For example, the negative electrode 82 may be disposed below the semiconductor ink 80 and the positive electrode 78 may be arranged over the aforementioned semiconductor ink 80. Likewise, additional components, such as the bus bars 84, 86 may also be placed in any orientation such that the light-producing assembly 74 may emit the excitation light 24 (FIG. 7) towards a desired location.

The LED sources 72 may be dispersed in a random or controlled fashion within the semiconductor ink 80 and may be configured to emit focused or non-focused light toward the photoluminescent structure 10. The LED sources 72 may correspond to micro-LEDs of gallium nitride elements in the range of about 5 to about 400 microns in width and the semiconductor ink 80 may include various binders and dielectric material including, but not limited to, one or more of gallium, indium, silicon carbide, phosphorous, and/or translucent polymeric binders or any combination thereof.

The semiconductor ink 80 can be applied through various printing processes, including ink jet and silk screen processes to selected portion(s) of the positive electrode 78. More specifically, it is envisioned that the LED sources 72 are dispersed within the semiconductor ink 80, and shaped and sized such that a substantial quantity of the LED sources 72 align with the positive and negative electrodes 78, 82 during deposition of the semiconductor ink 80. The portion of the LED sources 72 that ultimately are electrically connected to the positive and negative electrodes 78, 82 may be illuminated by a combination of the bus bars 84, 86, controller 96, power source 98, and conductive leads 88, 90. According to one embodiment, the power source 98 may correspond to a vehicular power source 98 operating at about 12 to 16 VDC. Additional information regarding the construction of printed LED light-producing assemblies is disclosed in U.S. Patent Publication No. 2014/0264396 A1 to Lowenthal et al., entitled "ULTRA-THIN PRINTED LED LAYER REMOVED FROM SUBSTRATE," the entire disclosure of which is incorporated herein by reference.

The optical device 62 is disposed above the light-producing assembly. The optical device 62 may be formed in any practicable shape and may transmit light in a uniform manner to the photoluminescent structure 10. With respect to the presently illustrated embodiment, the photoluminescent structure 10 may be arranged as a multi-layered structure including an energy conversion layer 16, optional stability layer 20, and optional protection layer 22, as described above.

An overmold material 90 may be disposed around the light-producing assembly 74 and photoluminescent structure 10. The overmold material 90 may protect the light-producing assembly 74 from physical and chemical damage arising from environmental exposure. The overmold material 90 may have viscoelasticity (i.e., having both viscosity and elasticity), a low Young's modulus, and/or a high failure strain compared with other materials so that the overmold material 90 may protect the light-producing assembly 74 when contact is made thereto.

An adhesive layer 92 may be disposed above the photoluminescent structure 10 for attaching the light-producing assembly 74 to an interior surface of the housing. However, in alternate embodiments, the light-producing assembly 74 may be disposed within the badge in any other manner. The adhesive layer 92 may be configured as any type of light transmissive adhesive, such as any optically clear adhesive (OCA) known in the art. The adhesive may be selected to provide desired properties suitable for application within the badge 28. For example, the adhesive layer 92 can include a material chosen from polymeric, acrylic based, and/or non-acrylic based materials. Alternatively, the adhesive layer 92 can include rubber based adhesives. The rubber based adhesive can be a natural or synthetic rubber material. For example, the rubber based pressure-sensitive adhesive can include natural and/or synthetic elastomeric polymers based on synthetic or natural rubber, such as natural rubber (polyisoprene), polybutadiene, synthetic polyisoprene, random styrene-butadiene (SB) polymers, SB block copolymers, multi-armed and/or repeating SB copolymers or any combination thereof. According to an alternate embodiment, two-sided transparent and/or transparent tape may be utilized.

Still referring to FIG. 6, the decorative layer 68 may be adhered to the adhesive layer 92, or any other component and/or layer within the badge 28. The decorative layer 68 may be made of any practicable material, such as a polymer and may be light transmissive.

In some embodiments, the photoluminescent structure 10 may be employed separate and away from the light-producing assembly 74. For example, the photoluminescent structure 10 may be positioned elsewhere on a vehicle 32, the grille assembly 40, and/or a surface proximate thereto, but preferably not in physical contact with the light-producing assembly 74. It will be understood that in embodiments where the photoluminescent structure 10 is incorporated into distinct components separated from the light source 42, the light source 42 may still have the same or similar structure to the light source 42 described in reference to FIG. 6.

Referring to FIG. 7, an energy conversion process 94 for producing a passively and actively illuminated badge 28 is illustrated according to one embodiment. For purposes of illustration, the energy conversion process 94 is described below using the light source 42 depicted in FIG. 6. In this embodiment, the first photoluminescent structure 10 includes a single photoluminescent material 18, which is configured to convert the excitation light 24, at a first wavelength, received from the LED sources 72 and/or natural light sources (e.g., the sun) into a converted light 26 having a second wavelength different than that associated with the excitation light 24. According to one embodiment, the first photoluminescent structure 10 may include a long persistence photoluminescent material 18 that appears white in the unexcited state and emits blue, converted light 26 upon receiving excitation light 24. A second photoluminescent structure 70 having a second photoluminescent material 18 therein may be disposed between the first photoluminescent structure 10 and the housing 44. The second photoluminescent structure 70 may be excited by a second excitation light 100 emitted from the LED sources at the first wavelength, or a third wavelength, into a converted light 102 of a fourth wavelength. Additionally, or alternatively, the second photoluminescent structure 70 may be configured to be excited by the converted light 26 of the first photoluminescent structure 10 and thereby emit converted light 102 of the fourth wavelength.

In one embodiment, the energy conversion process 94 is undertaken by way of down conversion, whereby the excitation light 24 includes light on the lower end of the visibility spectrum such as blue, violet, or ultraviolet (UV) light. Doing so enables blue, violet, or UV LEDs to be used as the LED sources 72, which may offer a relative cost advantage over simply using LEDs of the desired color and foregoing the energy conversion, process altogether. Furthermore, the illumination provided by the light transmissive portions 64 may offer a unique, substantially uniform, and/or attractive viewing experience that may be difficult to duplicate through non-photoluminescent means.

Figure 8:
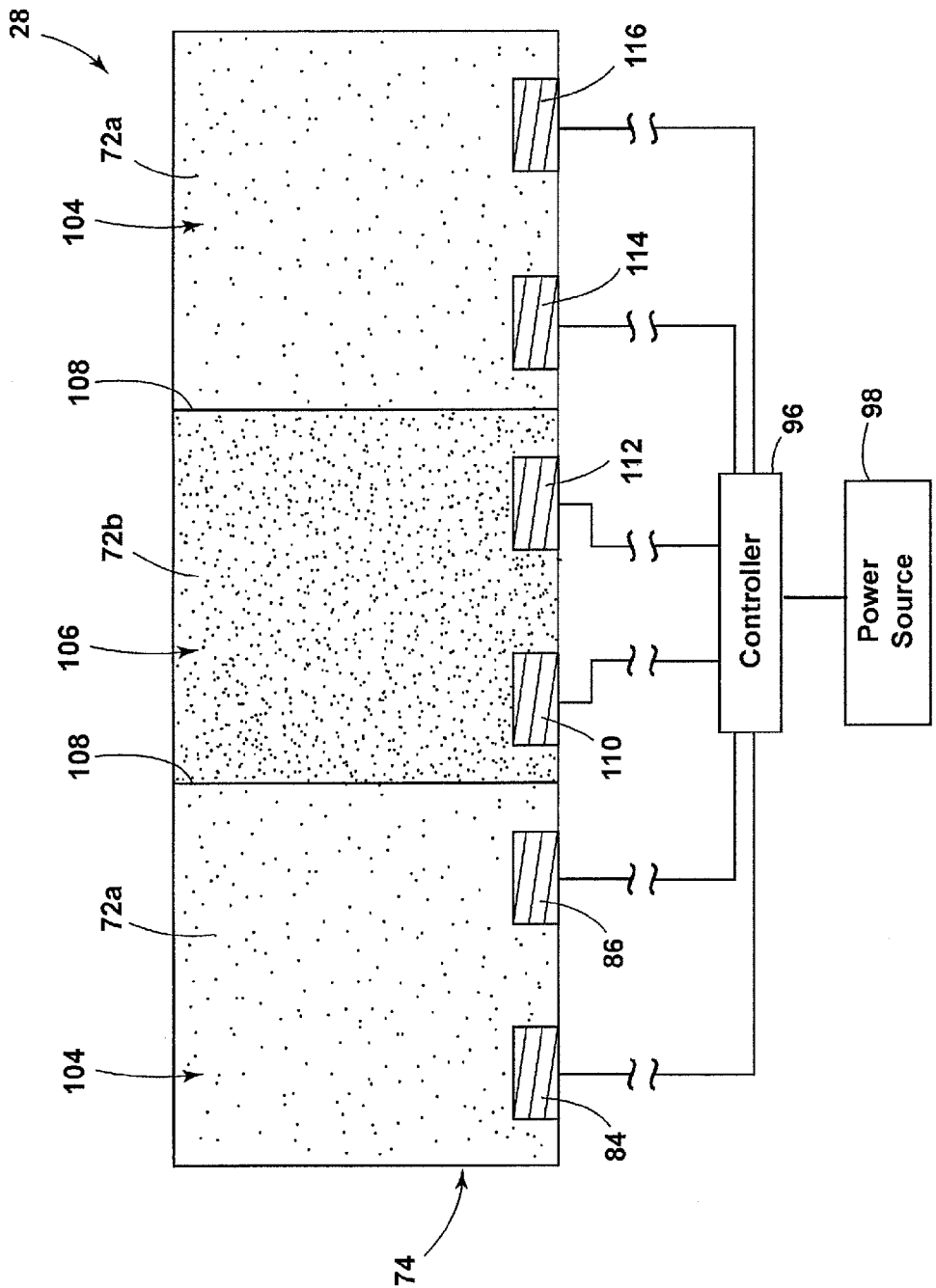
FIG. 8 is a top view of a light-producing assembly, according to one embodiment, having varying types and concentrations of LED sources transversely along the light-producing assembly.

Referring to FIG. 8, a light-producing assembly 74, according to one embodiment, is illustrated from a top view having varying types and concentrations of LED sources 72a, 72b transversely along the light-producing assembly 74. As illustrated, a first portion 104 of the light-producing assembly 74 includes LED sources 7 that are configured to emit an excitation light 24 having an emission wavelength in a first color (e.g., white) spectrum. Likewise, a second portion 106 of the light-producing assembly 74 includes LED sources 72c that are configured to emit an excitation light 24 having an emission wavelength in a second color (e.g., red) spectrum. The first and second portions 104, 106 of the light-producing assembly 74 may be separated by insulative, or non-conductive, barriers 108 from proximately disposed portions through any means known in the art such that each portion 104, 106 may be illuminated independently of any other portion 104, 106. Further, each portion 104, 106 disposed within the light-producing assembly 74 may include a respective bus bar 84, 86, 110, 112, 114, 116 coupled to the controller 96 and configured to illuminate each respective portion 104, 106. It will be appreciated that the bus bars 84, 86, 110, 112, 114, 116 may be coupled to each portion 104, 106 of the light-producing assembly 74 on opposing sides in alternate embodiments, as described above.

The LED sources 72a and 72b may be selectively activated using the controller 96 to cause the LED sources 72a, 72b to illuminate in a variety of colors. For example, the controller 96 may activate only LED sources 72a to exclusively illuminate a first portion 104 of the light-producing assembly 74 in the first color. Alternatively, the controller 96 may activate only LED sources 72c to exclusively illuminate a second portion 106 of the light-producing assembly 74 in the second color. It will be appreciated that the light-producing assembly 74 may include any number of portions 104, 106 having varying LED sources 7a, 72b that may illuminate in any desired color. Moreover, it should also be appreciated that the portions having varying LED sources 72a, 72b may be orientated in any practicable manner and need not be disposed adjacently.

The semiconductor ink 80 may also contain various concentrations of LED sources 72a, 72b such that the density of the LED sources 72a, 72b, or number of LED sources 72a, 72b per unit area, may be adjusted for various lighting applications. In some embodiments, the density of LED sources 72a, 72b may vary across the length of the light source 42. For example, second portion 106 of the light-producing assembly 74 may have a greater density of LED sources 72 than peripheral, first portions 104, or vice versa. In such embodiments, the light source 42 may appear brighter or have a greater luminance in order to preferentially illuminate pre-defined locations. In other embodiments, the density of LED sources 72a, 72b may increase or decrease with increasing distance from a preselected point.

Figure 9:
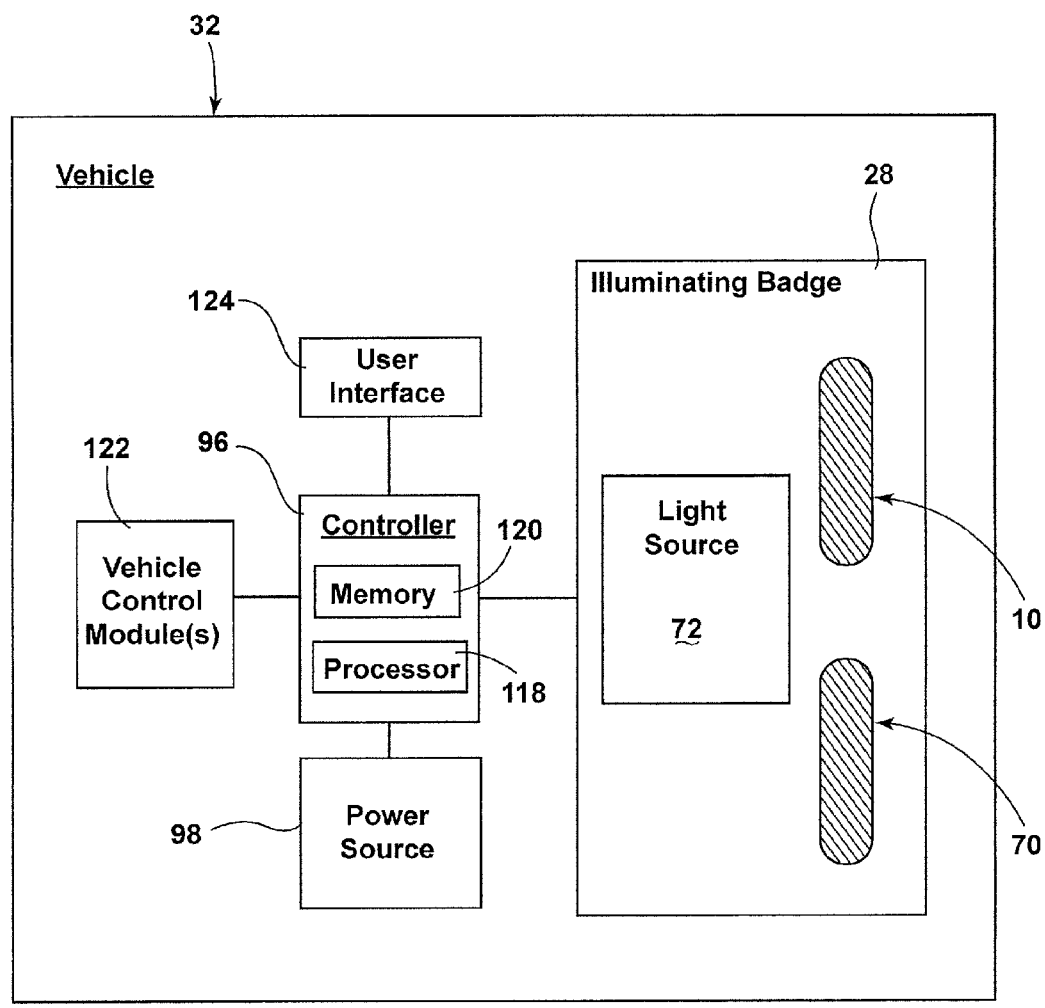
FIG. 9 is a block diagram of the vehicle and the badge.

Referring to FIG. 9, a block diagram of a vehicle 32 is generally shown in which the badge 28 may implemented, according to one embodiment. The badge 28 includes a controller 96 in communication with the light source 42. The controller 96 may include memory 120 having instructions contained therein that are executed by a processor 118 of the controller 96. The controller 96 may provide electrical power to the light source 42 via a power source 98 located onboard the vehicle 32. In addition, the controller 96 may be configured to control the excitation light 24 emitted from each light source 42 within the badge 28 based on feedback received from one or more vehicle control modules 122 such as, but not limited to, a body control module, engine control module, steering control module, brake control module, the like, or a combination thereof. By controlling the light output of the light source 42, the badge 28 may illuminate in a variety of colors and/or patterns to provide an aesthetic appearance or vehicle information to an intended observer. For example, the illumination provided by the badge 28 may be used for numerous vehicle applications, such as, but not limited to, a car finding feature, a remote start indicator, a door lock indicator, a door ajar indicator, a running light, a brake light indicator, etc.

In operation, the first and/or the second photoluminescent structures 10, 70 receive the excitation light 24 and, in response, emits the converted light 26 therefrom. The first and/or the second photoluminescent structure(s) 10, 70 may contain a long persistence phosphorescent material such that the photoluminescent structure 10, 70 emits the converted light 26 while the excitation light 24 is present, and maintains an illuminated state for a period of time thereafter. For example, according to one embodiment, the first and/or the second photolumine scent structure 10, 70 may emit light for 8 hours after the removal of the excitation light 24.

In another embodiment, the badge 28 may include a user interface 124. The user interface 124 may be configured such that a user may control the wavelength of excitation light 24 that is emitted by the light source 42. Such a configuration may allow a user to control the illumination patterns of the badge 28.

With respect to the above examples, the controller 96 may modify the intensity of the emitted first and second wavelengths of excitation light 24 by pulse-width modulation or current control. Also, the controller 96 may vary power to each light source 42 from 1 to 5 times steady state current to vary the color and brightness of each illumination. The controller 96 may also illuminate multiple colors within a single multicolored light source 42 concurrently, thereby producing additional color configurations.

In some embodiments, the controller 96 may be configured to adjust a color of the emitted light by sending control signals to adjust an intensity or energy output level of the light source 42. For example, if the light source(s) 42 are configured to emit the excitation light 24 at a low level, substantially all of the excitation light 24 may be converted to the converted light 26 by the first and/or the second photoluminescent structures 10, 70. In this configuration, a color of light corresponding to the converted light 26 may correspond to the color of the emitted light from the badge 28. If the light source(s) 42 are configured to emit the excitation light 24 at a high level, only a portion of the excitation light 24 may be converted to the converted light 26 by the first and/or the second photoluminescent structures 10, 70. In this configuration, a color of light corresponding to mixture of the excitation light 24 and the converted light 26 may be output as the emitted light. In this way, the controller 96 may control an output color of the emitted light.

Though a low level and a high level of intensity are discussed in reference to the excitation light 24, it shall be understood that the intensity of the excitation light 24 may be varied among a variety of intensity levels to adjust a hue of the color corresponding to the emitted light from the badge 28. The variance in intensity may be manually altered, or automatically varied by the controller 96 based on pre-defined conditions. According to one embodiment, a first intensity may be output from the badge 28 when a light sensor senses daylight conditions. A second intensity may be output from the badge 28 when the light sensor determines the vehicle 32 is operating in a low light environment.

As described herein, the color of the converted light 26 may be significantly dependent on the particular photoluminescent materials 18 utilized in the first and second photoluminescent structures 10, 70. Additionally, a conversion capacity of the first and second photoluminescent structures 10, 70 may be significantly dependent on a concentration of the photoluminescent material 18 utilized in the photoluminescent structures 10, 70. By adjusting the range of intensities that may be output from the light source(s) 42, the concentration, types, and proportions of the photoluminescent materials 18 in the photoluminescent structures 10, 70 discussed herein may be operable to generate a range of color hues of the emitted light by blending the excitation light 24 with the converted light 26. Moreover, the first and second photoluminescent structures 10, 70 may include a wide range of photoluminescent materials 18 that are configured to emit the converted light 26 for varying lengths of time.

Accordingly, an illuminating badge for a vehicle has been advantageously described herein. The badge provides various benefits including an efficient and cost-effective means to produce illumination that may function as a distinct styling element that increases the refinement of a vehicle, or any other product that may have an illumination assembly disposed thereon.

It is also important to note that the construction and arrangement of the elements of the disclosure as shown in the exemplary embodiments are illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown in multiple parts may be integrally formed, the operation of the interfaces may be reversed or otherwise varied, the length or width of the structures and/or members or connectors or other elements of the system may be varied, the nature or number of adjustment positions provided between the elements may be varied. It should be noted that the elements and/or assemblies of the system might be constructed from any of the wide variety of materials that provide sufficient strength or durability, in any of the wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A badge, comprising:
   a housing attached to a substrate to form a viewable portion, a peripheral portion, and a rear portion;
   a light source operably coupled with an optical device;
   a first photoluminescent structure disposed between the light source and the housing and configured to emit a first converted light in response to a first excitation light; and
   a second photoluminescent structure disposed between the first photoluminescent structure and the housing and configured to emit a second converted light in response to a second excitation light.

2. The badge of claim 1, wherein the first excitation light and second excitation light each comprises at least one of blue light, violet light, and UV light.

3. The badge of claim 2, wherein the first photoluminescent structure and the second photoluminescent structure each includes at least one photoluminescent material therein configured to down convert an excitation light received from at least a portion of the light sources into a visible converted light.

4. The badge of claim 1, wherein the first photoluminescent structure includes a long persistence photoluminescent material.

5. The badge of claim 1, wherein the first converted light is of the same wavelength as the second excitation light.

6. The badge of claim 1, wherein the light source is configured to emit the first excitation light at a plurality of wavelengths such that the first and second photoluminescent structures may be independently excited.

7. A badge, comprising:
   a housing attached to a substrate to form a viewable portion;
   a light source disposed between the housing and substrate and operably coupled with an optical device; and first and second photoluminescent structures each disposed between the light source and the housing and configured to emit a converted light through a light transmissive portion in response to an excitation light.

8. The badge of claim 7, wherein the first photoluminescent structure is disposed on a surface of the optical device.

9. The badge of claim 7, wherein the first photoluminescent structure and second photoluminescent structure each comprises at least one photoluminescent material configured to down convert an excitation light received from at least a portion of the light source into a visible light that is outputted to a viewable portion.

10. The badge of claim 7, wherein the first photoluminescent structure includes a long persistence photoluminescent material therein that is configured to illuminate for two hours or more once the excitation light is removed.

11. The badge of claim 10, wherein the first photoluminescent structure includes a short persistence photoluminescent material therein that is configured to illuminate for 100 millisecond or less once the excitation light is removed.

12. The badge of claim 8, wherein the light source comprises a plurality of printed LEDs.

13. The badge of claim 10, further comprising:
indicia on the viewable portion that correspond with the light transmissive portion such that the converted light escapes the badge through the indicia.

14. The badge of claim 7, wherein the first photoluminescent structure corresponds to a translucent background region and the second photoluminescent structure corresponds to indicia.

15. A badge comprising:
a housing attached to a substrate;
a viewable portion on the housing having a light transmissive portion;
a light source disposed between the housing and the substrate and operably coupled with an optical device; and
a first photoluminescent structure including a long persistence photoluminescent material disposed between the light source and the housing and configured to emit a converted light in response to an excitation light.

16. The badge of claim 15, further comprising:
a second photoluminescent structure disposed between the first photoluminescent structure and housing and configured to emit a converted light in response to an excitation light emitted by the light source.

17. The badge of claim 16, further comprising:
a decorative layer disposed between the second photoluminescent structure and the housing configured to form a light transmissive portion.

18. The badge of claim 17, wherein the decorative layer forms a reflective layer such that the indicia appear metallic when the first photoluminescent structure, the second photoluminescent structure, and the light source are in an unilluminated state.

19. The badge of claim 15, wherein the excitation light comprises one of blue light, violet light, and UV light.

20. The badge of claim 16, wherein the first photoluminescent structure and the second photoluminescent structure emit light simultaneously to form white light.

* * * * *